United States Patent
Le Van Gong et al.

(10) Patent No.: US 12,488,273 B2
(45) Date of Patent: Dec. 2, 2025

(54) QUANTUM-COMPUTER-BASED MACHINE LEARNING

(71) Applicant: PayPal, Inc., San Jose, CA (US)

(72) Inventors: Hubert Andre Le Van Gong, San Jose, CA (US); Niraj Kumar, Amsterdam (NL); Nitin S. Sharma, San Francisco, CA (US)

(73) Assignee: PAYPAL, INC., San Jose, CA (US)

(*) Notice: Subject to any disclaimer, the term of this patent is extended or adjusted under 35 U.S.C. 154(b) by 1013 days.

(21) Appl. No.: 17/561,804

(22) Filed: Dec. 24, 2021

(65) Prior Publication Data

US 2023/0206108 A1    Jun. 29, 2023

(51) Int. Cl.
  *G06N 10/60* (2022.01)
  *G06N 3/045* (2023.01)

(52) U.S. Cl.
  CPC ............ *G06N 10/60* (2022.01); *G06N 3/045* (2023.01)

(58) Field of Classification Search
  CPC ........ G06N 10/60; G06N 3/045; G06N 3/047; G06N 20/10; G06N 3/08; G06N 20/00; G06N 20/20; G06N 5/01; G06N 7/01; G06N 10/00
  See application file for complete search history.

(56) References Cited

U.S. PATENT DOCUMENTS

| | | | |
|---|---|---|---|
| 2018/0349605 A1* | 12/2018 | Wiebe | G06N 3/045 |
| 2020/0184278 A1 | 6/2020 | Zadeh et al. | |
| 2020/0285947 A1 | 9/2020 | Gunnels et al. | |
| 2021/0342730 A1 | 11/2021 | Redmond et al. | |
| 2021/0357838 A1 | 11/2021 | Cella et al. | |
| 2022/0374655 A1* | 11/2022 | Lowe | G06N 20/10 |
| 2024/0054379 A1* | 2/2024 | Hodson | G06N 10/60 |

OTHER PUBLICATIONS

International Preliminary Report on Patentability for Application No. PCT/US2022/052591, mailed on Jul. 4, 2024, 6 pages.
International Search Report and Written Opinion for Application No. PCT/US2022/052591 mailed on Mar. 8, 2023, 11 pages.

* cited by examiner

*Primary Examiner* — Kuang F Chen
(74) *Attorney, Agent, or Firm* — HAYNES AND BOONE, LLP

(57) ABSTRACT

Quantum computers with a limited number of input qubits are used to perform machine learning processes having a far greater number of trainable features. A list of features of a field are divided into a plurality of feature groups. Each of the feature groups includes a respective group of some, but not all, of the features. A first machine learning process is performed to train a first instance of a quantum computer model, where the feature groups are used as inputs. Based on the first machine learning process being performed, a subset of the feature groups is selected for a second machine learning process. Thereafter, the second machine learning process is performed to train one or more second instances of the quantum computer model. The individual features of the selected subset of the feature groups are used as inputs for the second instances of the quantum computer model.

16 Claims, 7 Drawing Sheets

QUANTUM-COMPUTER-BASED MACHINE LEARNING

BACKGROUND

Technical Field

The present disclosure generally relates to quantum computers and machine learning, and more particularly, to applying machine learning processes to specific quantum computer models according to some embodiments of the present disclosure.

Related Art

Rapid advances have been made in the past several decades in the fields of computer technology. Recently, quantum computers have been introduced, which have qubits that are quantumly entangled and are in a superposition of two states simultaneously. By doing so, quantum computers can perform computational tasks exponentially faster than conventional computers. For example, in mere minutes, a quantum computer can solve a complex computational problem that would have taken a conventional supercomputer months or years to solve. The excellent computational capabilities of quantum computers make them attractive candidates for performing machine learning tasks, since machine learning requires an extensive amount of data analysis. Unfortunately, current quantum computers can only handle a small number of inputs (e.g., typically less than 100), whereas machine learning processes may require thousands or tens of thousands of inputs. As such, current day quantum computers have not been sufficiently used to perform machine learning.

DETAILED DESCRIPTION

Figure 1:
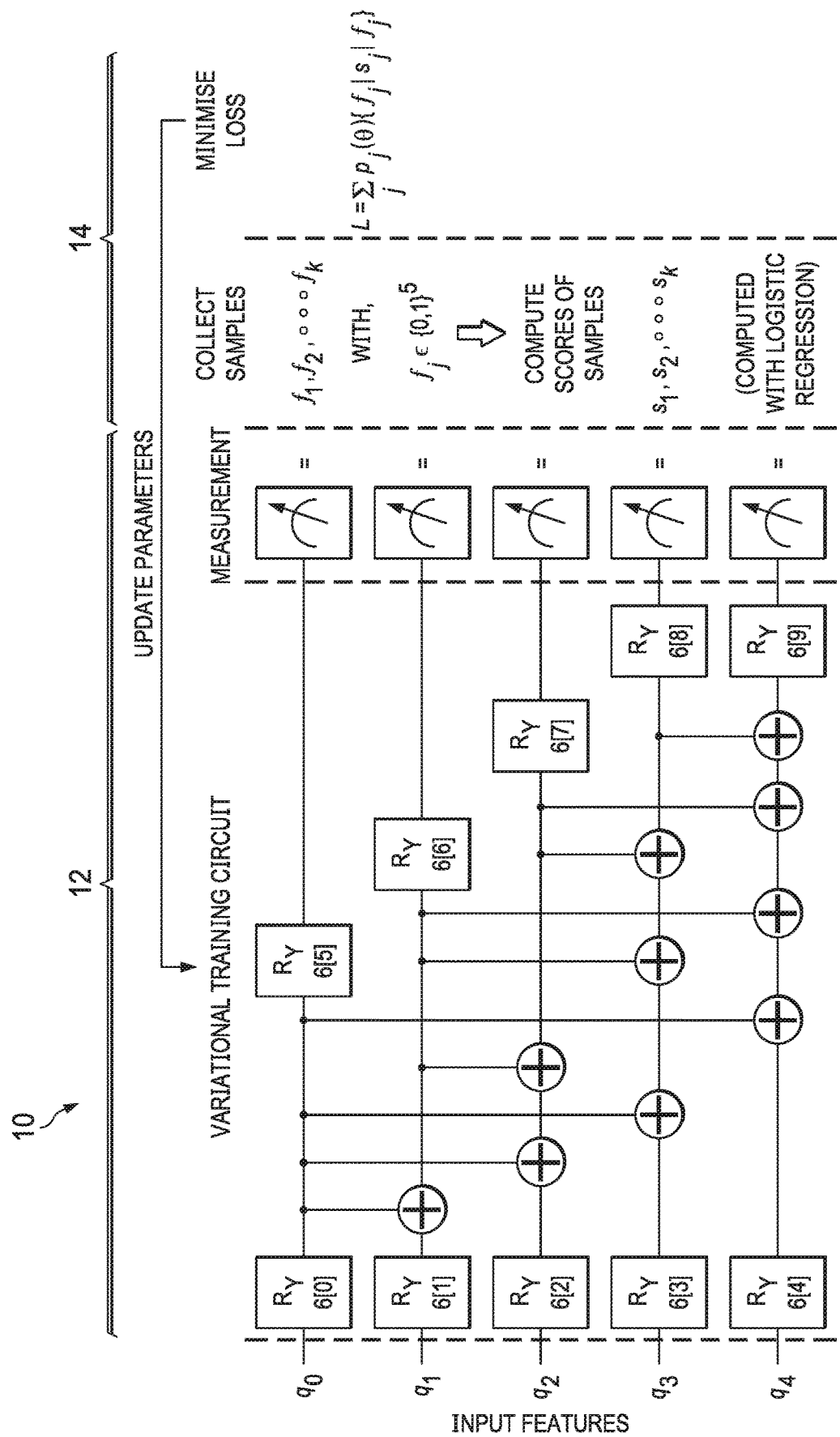
FIG. 1 is a simplified block diagram of a quantum computer machine learning model according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Analogous to traditional classical computers, quantum computers have recently attracted a lot of attention primarily due their potential benefits in solving certain computational tasks compared to the classical analogues. Quantum computers leverage qubits as their fundamental block which when entangled in a certain manner, allows for performing a desired computation. Certain algorithmic tasks performed on quantum computers provide an exponential speedup compared to the classical algorithms. These include tasks such as prime factoring, which is relevant for breaking RSA cryptosystem, Random circuit sampling (RCS), Boson sampling (BS), verification of NP problems with limited information (NP-Ver), among others. In fact, this speedup has been demonstrated for RCS, BS and NP-Ver where the quantum algorithms solve these tasks in mere minutes which a conventional classical algorithm would take days or even months to years to realize. Unfortunately, the current state of art quantum computers is small in scale, typically ~50-200 qubits with ability to perform limited depth computations. This limits the size of problems addressable by the current quantum computers. In contrast, the traditional big-data regime machine learning processes require inputs with thousands or tens or thousands of features. This prohibitively limits the implementation current machine learning tasks on the small scale quantum computers. As such, modern day quantum computers, despite having excellent computing power, have not been widely used in real world machine learning processes.

The present disclosure overcomes this problem via a divide-and-conquer approach. Rather than mapping each feature of the input of a machine learning process directly to an input of a quantum computer (which is impractical since the number of features far exceed the number of available inputs of the quantum computer), the features are grouped into various feature groups, such that the number of feature groups matches (or is less than) the number of inputs of a quantum computer. The feature groups are fed to a first instance of a quantum computer-based machine learning model (whose number of qubits matches the number of feature groups) to identify the best feature groups for performing a predefined task (e.g., for making a prediction of fraud). The individual features of each of the identified best feature groups are then fed to a respective second instance of the quantum computer-based machine learning model to identify the best individual features for performing the predefined task. The results of the first and second instances of the quantum computer-based machine learning model are also fed back to the beginning of the process, so that the features are remixed, and new feature groups are generated. The entire process may be repeatedly performed for a number of iterations until the best features are identified. In this manner, despite the quantum computer having limitations on the number of inputs, the quantum computer may still be used to successfully perform a machine learning process having a far greater number of features that need to be analyzed by the quantum computer. As such, the present disclosure not only improves the functionality of a quantum computer, it is also integrally tied to specific technology environments (quantum computing and machine learning). The various aspects of the present disclosure will be discussed below in more detail with reference to FIGS. 1-8.

FIG. 1 is a block diagram of a quantum computer machine learning model 10 according to one non-limiting embodiment. The quantum computer machine learning model 10 is configured to receive a set of trainable features as its input and use an iterative process to identify the features that are more relevant than the rest of the features in performing a predefined task or achieving a predefined objective. In that regard, the trainable features may vary depending on the context or the field of the machine learning process. Using the context of electronic transactions as an example, one goal of the machine learning process may be to detect fraud. The features of transactions that may be used to evaluate fraud may include, but are not limited to, user login credentials, a transaction amount, a transaction volume, a physical address associated with the transaction, a phone number associated with the transaction, an email address associated with the transaction, a domain name of the email address, a user name of the email address, an Internet Protocol (IP) address from which the transaction originated, a payment frequency, the type of goods purchased, etc. Some of these features may be more relevant to identifying fraud than other features. By training the quantum computer machine learning model 10, the more relevant features may be identified or obtained as an output. For example, by training the quantum computer machine learning model 10, it may be determined that a specific IP address of a buyer and a transaction amount within a certain range are more relevant features than the rest of the features in determining whether a particular transaction is fraudulent. Note that the quantum circuit of FIG. 1 (which will be discussed below in more detail) is merely one possible quantum circuit architecture, and other suitable quantum circuit architectures are envisioned in alternative embodiments. As shown in FIG. 1, the quantum computer machine learning model 10 includes a parameterized quantum circuit 12 and an optimization circuit 14 coupled to the parameterized quantum circuit 12. At a high level, the quantum-classical optimization in FIG. 1 is performed based on the following steps:

1. Initialize the trainable parameters of the quantum circuit randomly.
2. Use the measurement of the quantum circuit to generate classical samples.
3. Feed the classical samples into a standard classical optimization routine.
4. Update the parameters of the quantum circuit using the classical optimization feedback.
5. Iteratively keep performing the procedure until a certain target level is reached.

In the embodiment shown in FIG. 1, the parameterized quantum circuit 12 itself includes a variational training circuit and a measurement circuit. The variational training circuit includes an alternating layer of trainable single qubit gates $R_y(\theta)$ to receive inputs $q_0$, $q_1$, $q_2$, $q_3$, and $q_4$ for the quantum computer machine learning model 10, which may be the trainable features of a machine learning process discussed above. However, as will be discussed below in more detail, these trainable features received by the layer of qubits may also be feature groups, where each feature group includes a plurality of features. In addition, it is understood that the variational training circuit is merely a non-limiting embodiment, and that other embodiments may be implemented using different circuits.

The layer of qubit gates is followed by a plurality of fixed two qubit entangling controlled-not (CNOT) gates of the variational training circuit. Each CNOT gate is visually represented by a "dot" and a "+" sign in the variational training circuit, and a subset of the CNOT gates are labeled herein as CNOT gates 16 in FIG. 1. The CNOT gates 16 are responsible for entangling the qubits in the quantum circuit and for leveraging the full quantum potential (since no entanglement in the circuit would mean that the circuit is classically efficiently simulatable, and hence no quantum advantage would be obtained).

The results of the variational training circuit are measured by the measurement circuit. In some embodiments, such as in superconducting and ion traps based quantum computers, the measurement circuit measures the results of the variational training circuit by measuring the electromagnetic frequency associated with the qubit gates. For example, the measurement circuit may apply a laser pulse on the layer of qubit gates, which may include a superconducting material. The application of the laser pulse may affect the state of the qubit (e.g., a state of 0 or 1), which affects the electromagnetic frequency associated with the qubit. As such, the measured electromagnetic frequency of the qubit may indicate the state the qubit is in.

The parameters of the quantum circuit are trained by the optimization circuit 14 using a loss function (also called an objection function):

$$L = \sum_j p_j(\theta) \langle f_j | s_j | f_j \rangle,$$

which may be hereinafter interchangeably denoted as L.

The quantum computer machine learning model 10 may be trained either using differential training (gradient-based methods) or non-differentiable training (gradient-free methods). In some scenarios, the gradient-based methods have been shown to perform better than the gradient-free approaches, but it is dependent on the nature of the task and the scale of the task. In some embodiments, the quantum circuit is trained using gradient-based imaginary time evolution, which is more robust compared to other gradient-based methods of training the quantum circuit. This is due at least in part to the fact that gradient-based imaginary time evolution uses second order gradients (also called Hessians), which provides better convergence guarantees compared to first order standard gradient methods.

The optimization circuit 14 is configured to minimize the loss function, for example, using a gradient descent-based technique. For the quantum computer machine learning model 10, the loss function depends on the probability of obtaining the samples from the parameterized quantum circuit 12. This probability of obtaining an output string is the squared norm of the overlap of the quantum state obtained by the parameterized quantum circuit 12 with the quantum state corresponding to the output string. This means that computing the gradient of the loss function with respect to the parameters in the circuit involves differentiating the output quantum state with respect to the circuit parameters. Multiple methods may be used to do so, including but not limited to, the parameter shift rule, finite difference methods, linear combination of unitary methods, etc.

The training of the quantum circuit includes multiple iterations. At each iteration, the quantum state $|\phi(\theta)\rangle = \cup(\theta)|\rangle$ arising from the variational training circuit is measured in the computational basis to obtain bit strings $f_1$, $f_2, \ldots, f_K \in \{0, 1\}^5$. The feature sets output by the quantum computer machine learning model 10 at any given iteration is then the number of non-zero elements in the bit strings. Repeated sampling of the bit strings also allows an estimation of the respective probability of the obtained samples: $p_1(\theta), p_2(\theta), \ldots p_K(\theta)$. For each of the obtained samples, logistic regression may be used to fit it with regards to the training data and compute the negative log-loss score with regards to test data. In some embodiments, the scores of the samples may be computed with logistic regression as scores $s_1, s_2, \ldots s_k$. The scores then determine the loss function L, which is then minimized, for example, using a gradient descent method, to update the parameters of the variational training circuit.

Figure 2:
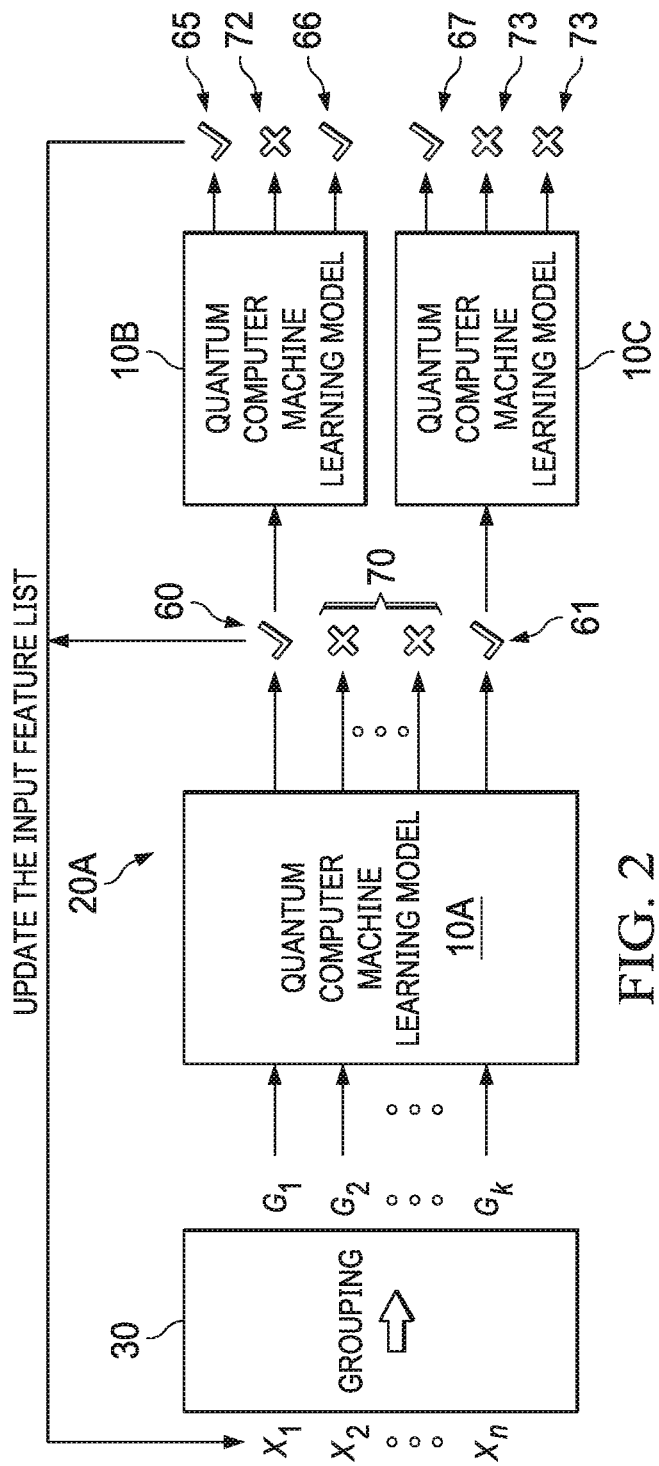
FIGS. 2-3 are simplified block diagrams illustrating machine learning process flows involving quantum computers according to various aspects of the present disclosure.

FIG. 2 is a block diagram that illustrates a machine learning process 20A that is performed at least in part using the quantum computer machine learning model 10 of FIG. 1 according to a first embodiment of the present disclosure. First, a plurality of features (labeled in FIG. 2 as $x_1, x_2 \ldots x_n$) are received, for example, by a feature grouping module 30 (which may be implemented using a non-quantum computer (e.g., a classical computer with standard 0 and 1 bits) with hardware components running specialized designed software code). As discussed above, the features may refer to various characteristics or properties of datasets that may pertain to a given context or field. As a non-limiting example, the context or field may be electronic transactions (where fraud is a concern), and the features may include: user login credentials, a transaction amount, a transaction volume, a physical address associated with the transaction, a phone number associated with the transaction, an email address associated with the transaction, a domain name of the email address, a user name of the email address, an Internet Protocol (IP) address from which the transaction originated, a payment frequency, the type of goods purchased, etc. Some of these features may be more relevant than others in predicting fraud (or for the performance of another predefined task). As such, a feature selection process may be performed to identify the more relevant features. Machine learning may be performed to facilitate the feature selection process. Practically speaking, thousands (or more) of features may need to be analyzed by the machine learning process to perform feature selection accurately. However, the quantum computer machine learning model 10 discussed above is typically limited to 100 or fewer inputs, which means the machine learning process herein cannot simply be performed by mapping each individual feature to a corresponding input of the quantum computer machine learning model on a 1-to-1 basis.

According to the various aspects of the present disclosure, the plurality of features $x_1, x_2 \ldots x_n$ is divided or grouped, by the feature grouping module 30, into a plurality feature groups (labeled as $G_1, G_2 \ldots G_k$ herein) as a first step of the machine learning process. In some embodiments, the number of feature groups matches the number of inputs of the quantum computer machine learning model 10. For example, suppose that the quantum computer machine learning model 10 has (or can accept) 50 inputs (e.g., having a layer of 50 qubits $q_0$ through $q_{49}$) and that there are 10,000 features $x_1$ through $x_{10,000}$. In that case, the 10,000 features can be divided into 50 groups $G_1$ through $G_{50}$, where each group has 200 features. Since the number of feature groups (50) now matches the number of inputs of the quantum computer machine learning model 10, each feature group may be mapped to a respective one of the inputs of the quantum computer machine learning model 10. In other words, a different one of the feature groups (each containing 200 features) is fed into a respective qubit gate of the quantum computer machine learning model 10 as its input. The features may be grouped into the feature groups using a variety of techniques, for example, using principal component analysis, random grouping, or sequential grouping, etc.

Next, a binary variable may be assigned for each of the feature groups. If the value of the binary variable is 1, the corresponding feature group is included for the subsequent training using a quantum computer machine learning model 10A, which is a first instance of quantum computer machine learning model 10 discussed above with reference to FIG. 1. If the value of the binary variable is 0, the corresponding feature group is not included for the subsequent training using the quantum computer machine learning model 10A. At the initial iteration, all the binary variables are assigned a value of 1, such that all the feature groups are initially used for the training using the quantum computer machine learning model 10A. For example, the quantum computer machine learning model 10A has k number of qubits that are each configured to accept a respective feature group (e.g., $G_1$ through $G_k$) as its input. The quantum computer machine learning model 10A also has a trainable quantum circuit parameterized by a $\hat{\theta}$ vector, which is initialized randomly. The quantum circuit is measured, and the outcome of the measurement is the binary string $X \in \{0, 1\}^n$. For example, the outcome of 0 in qubit i indicates that the feature group $G_i$ is included in the output, and the outcome of 1 in qubit i indicates that the feature group $G_i$ is excluded in the output. Multiple samplings of the quantum circuit are performed to obtain the distinct measurement outcome strings $X^1, \ldots X^l$ with probabilities $p_1(\hat{\theta}), \ldots p_l(\hat{\theta})$. Note that the probabilities $p_1(\hat{\theta}), \ldots p_l(\hat{\theta})$ are also lumped in the loss function shown $L_G$ in FIG. 1. While the quantum computer machine learning 10A is trained using the feature groups, the loss function $L_G$ is defined as:

$$L_G = \sum_i^l p_i(\hat{\theta}) s_i(X^i),$$

where $s_i$ is the classical scoring function using a standard classifier. The scoring function $s_i$ takes, as inputs, all the features of the groups selected in the outcome string $X_i$. Non-limiting examples of the classifiers for the scoring function include: logistic regression, decision tree based classifiers, etc.

After the quantum computer machine learning model 10A is trained, it generates an output that is an optimal vector $X \in \{0, 1\}^n$. This vector lists the feature groups 60-61 that are selected as well as feature groups 70 that are unselected or rejected by the model, where the selected feature groups are determined or identifies as being more relevant than the unselected or rejected feature groups in performing the predefined task (e.g., determining fraud in transactions). In FIG. 2, the selected feature groups 60 and 61 are each visually represented by a checkmark symbol ✓, whereas the unselected or rejected feature groups are each visually represented by a cross-out symbol χ. Note that the checkmark symbol ✓ may also be used hereinafter to represent selected feature groups or selected individual features outputted by various instances of the quantum computer machine learning model 10, and the cross-out symbol χ may also be used hereinafter to represent unselected feature groups or unselected individual features outputted by various instances of the quantum computer machine learning model 10.

The individual features of the selected feature groups 60-61 are then fed as inputs to additional instances of the quantum computer machine learning model, for example, to a quantum computer machine learning model 10B, which is a second instance of quantum computer machine learning model 10 discussed above with reference to FIG. 1, and a quantum computer machine learning model 10C, which is a third instance of quantum computer machine learning model 10 discussed above with reference to FIG. 1. Each of these instances of the quantum computer machine learning model 10 may be configured substantially similarly as the first instance of the quantum computer machine learning model 10A, except that their inputs are the individual features, rather than feature groups 60-61 themselves. In addition, the number of the inputs (e.g., the number of the qubits) of the quantum computer machine learning models 10B and 10C may be configured to match (or exceed) the number of the individual features being fed thereinto, which may or may not be the same as the number of the feature groups that are fed into the quantum computer machine learning model 10A as its input. In any case, the quantum computer machine learning models 10B and 10C then each outputs a subset of the individual features (e.g., as the selected features), such as individual features 65-67 (represented by the checkmarks ✓), that are more relevant than the rest of the individual features. The unselected features, such as the unselected features 72 (represented by the cross-out symbols χ) may then be discarded and will no longer be run through the quantum computer machine learning models herein. It is understood that the present disclosure uses multiple models (e.g., models 10A-10C) spanning different stages, rather than a single model, so as to accommodate but also expand the limitations of existing quantum computers, since existing quantum computers cannot handle a large number of inputs (e.g., no more than 50 or 100 inputs). Therefore, whereas a conventional computer may handle thousands of inputs (and thus perform machine learning in a single stage), the quantum-computer-based machine learning herein has to effectively break down the large number of inputs to be handled in multiple stages (e.g., first using feature groups, then individual features).

Meanwhile, the machine learning process herein will also use feedback to update the input features lists. This may be done in two stages. The first stage of the feedback is done at the output of the quantum computer machine learning model 10A, where the unselected feature groups 70 are fed back to the beginning (e.g., to the feature grouping module 30) of the machine learning process, rather than being discarded. This is because each feature group (whether selected or unselected) contains a plurality of features, and some of these features may still have high relevancy (e.g., with respect to detecting fraud), but the high irrelevancy of the rest of the features in that feature group resulted in that feature group being unselected. Thus, to prevent the potentially high relevancy features from being omitted, these unselected feature groups 70 (or the features contained therein) are fed back to the beginning of the process, where these features are then re-mixed by the feature grouping module 30 to generate new feature groups. By doing this process iteratively, eventually all the high relevancy features should be discovered. Note that although FIG. 2 illustrates a single arrow connecting the selected feature group 60 as the input for the model 10B (and likewise for the model 10C), the input to the model 10B/10C is not a single input, but rather a plurality of inputs, since the individual features contained in the selected feature group 60 is used as the inputs to the model 10B. In other words, the model 10B receives, as its inputs, a plurality of individual features that collectively make up the selected feature group 60. The model 10B also outputs a plurality of features, such as the selected individual features 65-66 and the unselected individual features 72-73. The same is true for the model 10C.

The second stage of the feedback is done at the output of the quantum computer machine learning models 10B and 10C, where the selected individual features, such as the individual features 65-67, are fed back to the beginning (e.g., to the feature grouping module 30) of the machine learning process. These selected features 65-67 may also be remixed with the features from the unselected groups 70 (generated as a part of the output of the quantum computer machine learning model 10A), as discussed above, to generate new feature groups. Again, by repeating such a process iteratively, eventually the most optimal features (e.g., the most relevant features for detecting fraud) may be obtained at the output of the quantum computer machine learning models 10B and 10C.

As a simplified example to illustrate the above process, suppose that 40 features $X_1$-$X_{40}$ are initially available (though it is understood that the actual number of features may be far greater in a real world practical application, for example in the thousands or tens of thousands), and these features are divided evenly into 4 groups $G_1$-$G_4$, using techniques such as principal component analysis, random grouping, or sequential grouping, etc. For the sake of simplicity, suppose that the features $X_1$-$X_{10}$ are grouped into the feature group $G_1$, the features $X_{11}$-$X_{20}$ are grouped into the feature group $G_2$, the features $X_{21}$-$X_{30}$ are grouped into the feature group $G_3$, and the features $X3_1$-$X_{40}$ are grouped into the feature group $G_4$.

After being trained by the quantum computer machine learning model 10A, the feature groups $G_1$ and $G_4$ have been identified as being more relevant than the feature groups $G_2$ and $G_3$. Thus, the individual features $X_1$-$X_{10}$ (of the feature group $G_1$) are fed into the quantum computer machine learning model 10B as its inputs, and the individual features $X_{31}$-$X_{40}$ (of the feature group $G_4$) are fed into the quantum computer machine learning model 10C as its inputs. The quantum computer machine learning model 10B may output the features $X_1$ and $X_{10}$ as the optimal (e.g., more relevant in fraud detection) features, while indicating that the features $X_2$ and $X_9$ are suboptimal and therefore should be discarded. The quantum computer machine learning model 10C may output the features $X_{31}$ and $X_{32}$ as the optimal (e.g., more relevant in fraud detection) features, while indicating that the features $X_{33}$-$X_{40}$ are suboptimal and therefore should be discarded. As such, the preliminarily identified optimal individual features are the features $X_1$, $X_{10}$, and $X_{31}$-$X_{32}$, which are the features selected by the initial iteration of the machine learning process herein.

These features $X_1$, $X_{10}$, and $X_{31}$-$X_{32}$ are then fed back to the beginning (e.g., to the feature grouping module 30) of the machine learning process, along with the features $X_{11}$-$X_{30}$ of the unselected feature groups $G_2$ and $G_3$, to be remixed together to generate new feature groups. For example, 4 new feature groups $G_5$-$G_8$ may be generated, where the feature group $G_5$ may contain individual features $X_1$, $X_{10}$, $X_{11}$-$X_{14}$, the feature group $G_6$ may contain individual features $X_{15}$-$X_{20}$, the feature group $G_7$ may contain individual features $X_{21}$-$X_{26}$, and the feature group $G_8$ may contain individual features $X_{27}$-$X_{32}$. Of course, the sequential grouping of the individual features into the new feature groups $G_5$-$G_8$ is merely a simplified non-limiting example, and other grouping techniques may be used in other embodiments. In any case, the new feature groups $G_5$-$G_8$ are then run through the quantum computer machine learning model 10A, and the selected feature groups generated at its output are then fed into the quantum computer machine learning models 10B and 10C to identify a new subset of the optimal or relevant individual features. Such a process may be performed iteratively for a number of cycles, until a desired number of optimal individual features are identified. For example, the above process may terminate when the most relevant 5 features are identified.

It is understood that although the embodiment in FIG. 2 utilizes two stages (e.g., a first stage corresponding to the quantum computer machine learning model 10A and a second stage corresponding to the quantum computer machine learning models 10B and 10C) to perform the iterative machine learning process, three or more stages may be implemented in additional embodiments. The quantum computer machine learning models in these additional stages may be configured to accept either the feature groups or the individual features as their respective inputs. For example, a multi staged process can be implemented using layer-wise screening. In some embodiments, a three stage process may include:
 a first stage to perform group screening;
 a second stage to cluster the remaining groups after first stage in new groups, as well as to perform a group level screening again; and
 a third stage to perform feature level screening from the groups that remain after the second stage.

Based on the discussions above, it can be seen that the present disclosure implements a divide-and-conquer approach to break down a large number of features into a list of feature groups that each contain a respective subset of the features, so that an instance of the quantum computer machine learning model 10 can be run on the feature groups to obtain more relevant feature groups, and the feature groups are then run through various instances of the quantum computer machine learning 10 to obtain the most relevant individual features. In this manner, quantum computer machine learning having a small number of inputs can still be used effectively and practically in real world situations that require a far larger number of inputs to be analyzed.

Figure 3:
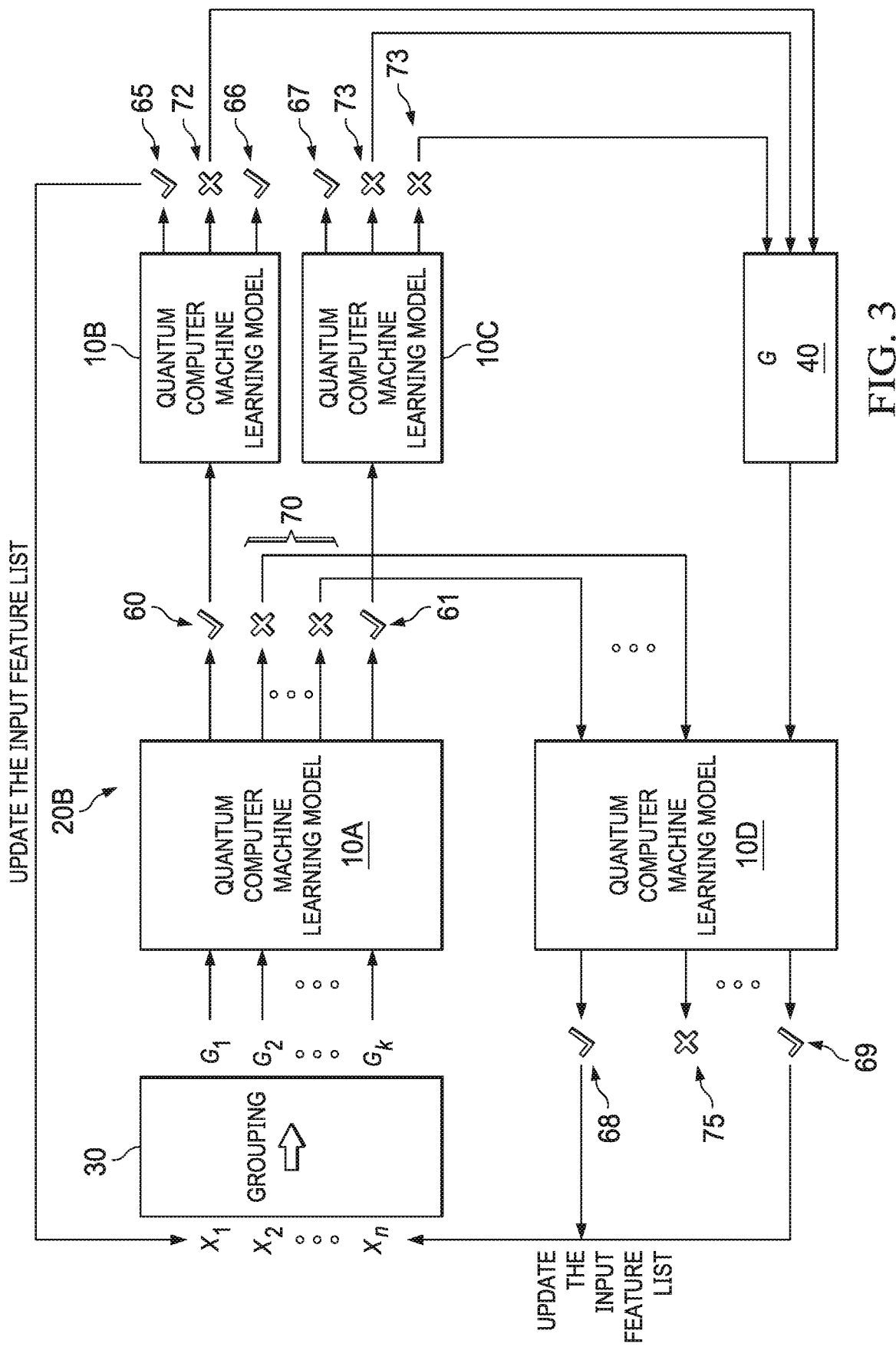

FIG. 3 is a block diagram that illustrates a machine learning process 20B that is performed at least in part using the quantum computer machine learning model 10 of FIG. 1 according to a second embodiment of the present disclosure. The second embodiment shares certain similarities with the first embodiment discussed above with reference to FIG. 2, and thus similar components will be labeled the same in both FIGS. 2-3. For example, the features $x_1, x_2 \ldots x_n$ are sorted into a list of feature groups $G_1, G_2 \ldots G_k$, and the feature groups $G_1$-$G_k$ are then fed into the quantum computer machine learning model 10A as its inputs. The quantum computer machine learning model 10A generates, as its outputs, a subset of selected feature groups (e.g., having higher relevancy for fraud detection), such as the selected feature groups 60-61, and a subset of unselected feature groups (e.g., having lower relevancy for fraud detection), such as the unselected feature groups 70. The individual features of the selected feature groups 60-61 are then fed into the quantum computer machine learning models 10B and 10C as their inputs, respectively. The quantum computer machine learning models 10B and 10C then generate, as their outputs, the subsets of individual features that are selected (represented by the checkmark symbol ✓), such as the selected features 65-67, as well as the subsets of individual features that are unselected (represented by the cross-out symbol χ), such as the unselected features 72-73.

However, the second embodiment differs from the first embodiment in how the feedback mechanism is implemented. For example, according to the first embodiment, the unselected feature groups 70 (from the output of the quantum computer machine learning model 10A) and the selected features 65-67 (from the outputs of the quantum computer machine learning models 10B and 10C) are fed back to the beginning of the machine learning process to be remixed by the feature grouping module 30 to generate new feature groups. In contrast, the second embodiment implements a fourth instance of the quantum computer machine learning model 10D to perform another stage of machine learning.

In more detail, the unselected or discarded individual features 72-73 outputted by the quantum computer machine learning models 10B and 10C are grouped, by another feature grouping module 40 (which may be similar to the feature grouping module 30 discussed above), into one or more new feature groups. These one or more new feature groups, along with the unselected or discarded feature groups 70 outputted by the quantum computer machine learning model 10A, are then fed into a quantum computer machine learning model 10D, which is yet another instance of quantum computer machine learning model 10 discussed above with reference to FIG. 1, as its inputs. The quantum computer machine learning model 10D then outputs another subset of selected feature groups, such as the selected feature groups 68-69, and another subset of unselected feature groups, such as the unselected feature groups 75. The features of the unselected feature groups 75 outputted by the quantum computer machine learning model 10D are permanently discarded, but the features from the selected feature groups 68-69 outputted by the quantum computer machine learning model 10D are fed back to the beginning of the machine learning process herein to be remixed by the feature grouping module 30. In addition, the selected features 65-67 outputted by the quantum computer machine learning models 10B and 10C are also fed back to the beginning of the machine learning process herein to be remixed by the feature grouping module 30, along with the features from the selected feature groups 68-69 outputted by the quantum computer machine learning model 10D.

The remixing of these features generates an updated list of feature groups, which are fed into the quantum computer machine learning model 10A again. The process discussed above may be iteratively repeated a number of times until a desired number of features are obtained, where the obtained features are more relevant (e.g., for purposes of detecting fraud or performing another predefined task) than the rest of the features.

Figure 4:
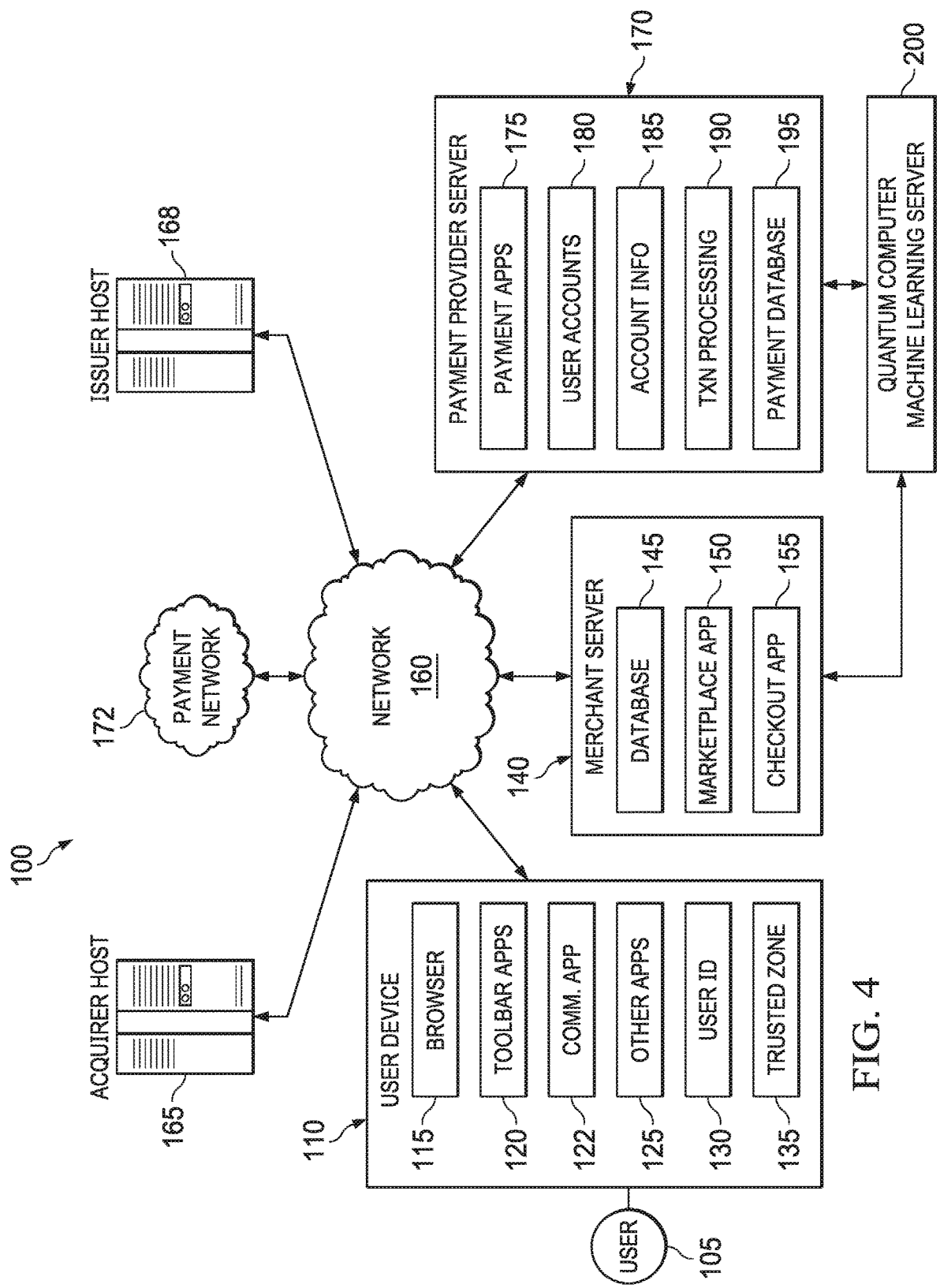
FIG. 4 is a simplified block diagram of a networked system according to various aspects of the present disclosure.

FIG. 4 is a block diagram of a networked system 100 suitable for conducting electronic online transactions, which is an example context from which the need for performing the quantum computer machine learning process herein may arise. For example, fraud detection may be an important concern in conducting electronic transactions, and the quantum computer machine learning process of FIGS. 2-3 may be performed to select the best or most relevant features (e.g., IP address, transaction amount, user ID, etc.) for determining fraud.

As shown in FIG. 4, the networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 4 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. The system 100 may further include a quantum computer machine learning server 200 that can communicate with one or more components of the system 100, for example, with the payment provider server 170 (or even with the merchant server 140) to perform the quantum computer machine learning processes discussed above.

Payment provider server 170 may be maintained by a payment service provider, such as PAYPAL™, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used here, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described here. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 4, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed here.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 4, the merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

The payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described here. As such, transaction processing application 190 may store details of an order from individual users, including funding source used, credit options available, etc. Payment application 175 may be further configured to determine the existence of and to manage accounts for user 105, as well as create new accounts if necessary.

The quantum computer machine learning server 200 may include quantum computers and conventional computers on which various instances of the quantum computer machine learning model 10 may be implemented. The quantum computer machine learning server 200 may be configured to receive, as its inputs, thousands (or more) features that need to be trained using the machine learning processes of the present disclosure, in order to determine a subset of most relevant features for determining fraud (or achieving another objective). The payment provider server 170 and/or the merchant server 140 may each send the list of features to the quantum computer machine learning server 200, and the quantum computer machine learning server 200 may return the subset of most relevant features after executing the quantum computer machine learning processes discussed above with reference to FIGS. 1-3.

It is understood that although the embodiment of FIG. 4 illustrates the quantum computer machine learning server 200 as a separate entity from the rest of the components of the system 100, this is not intended to be limiting. In some embodiments, the quantum computer machine learning server 200 (or a similar tool) may be implemented on the payment provider server 170, on the merchant server 140, or on a computer of the acquirer host 165 or a computer of the issuer host 168 as well. In other embodiments, the quantum computer machine learning server 200 may be divided in parts, with some parts being implemented on the payment provider server 170, while other parts are implemented on the merchant server 140 and/or the acquirer host 165 or issuer host 168.

Still referring to FIG. 4, the payment network 172 may be operated by payment card service providers or card associations, such as DISCOVER™, VISA™, MASTER-CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 5:
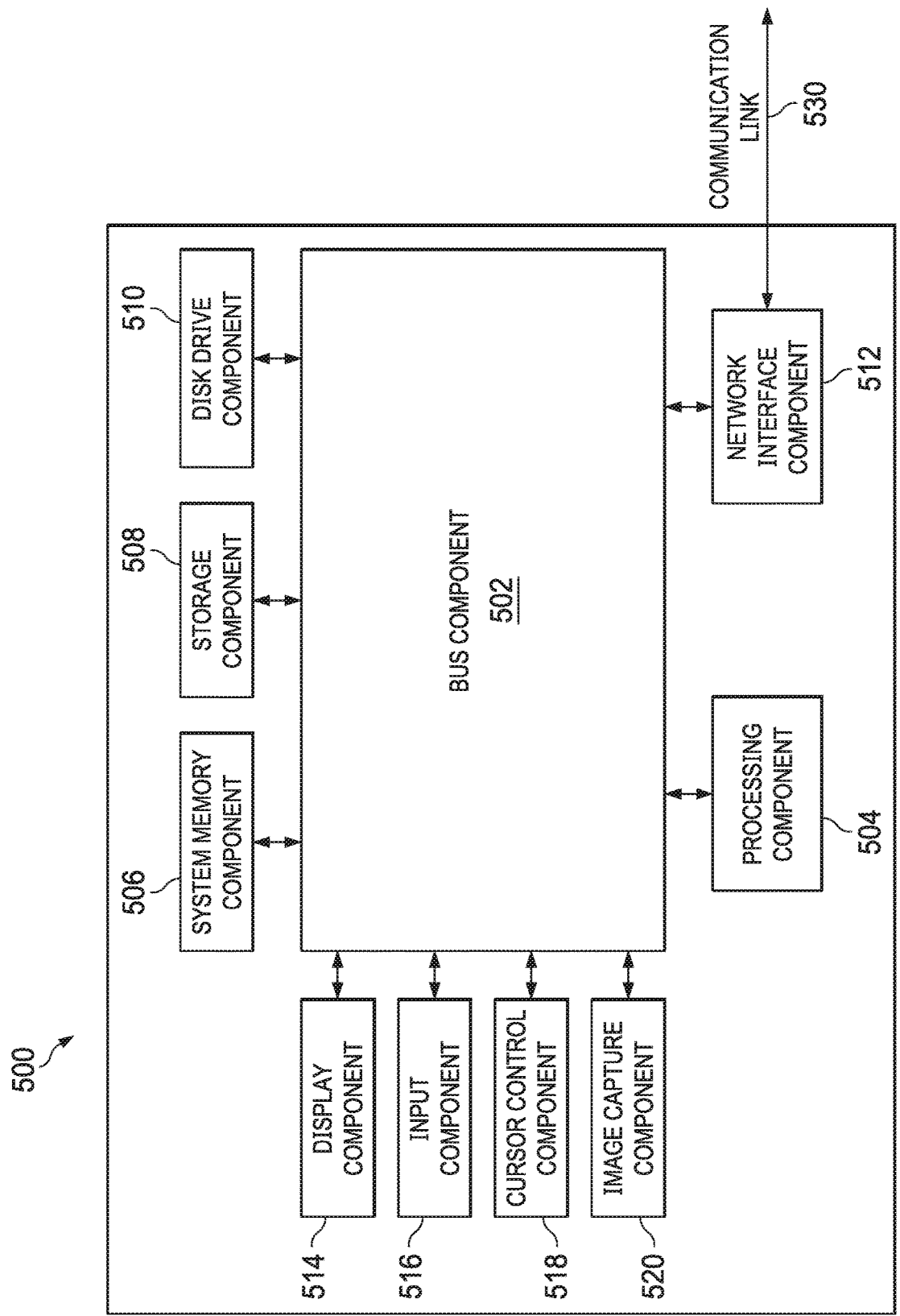
FIG. 5 is an example computer system for implementing the various hardware components according to various aspects of the present disclosure.

FIG. 5 is a block diagram of a computer system 500 suitable for implementing various methods and devices described herein, for example, the quantum computer machine learning server 200, the payment provider server 170, the merchant server 140, the user device 110, the computers of the acquirer host 165, the computers of the issuer host 168, or portions thereof. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the quantum computer machine learning model discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the various devices herein, for example, between the various quantum computer machine learning models.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the quantum computer machine learning server 200 discussed above may be implemented as such software code in some embodiments.

Figure 6:
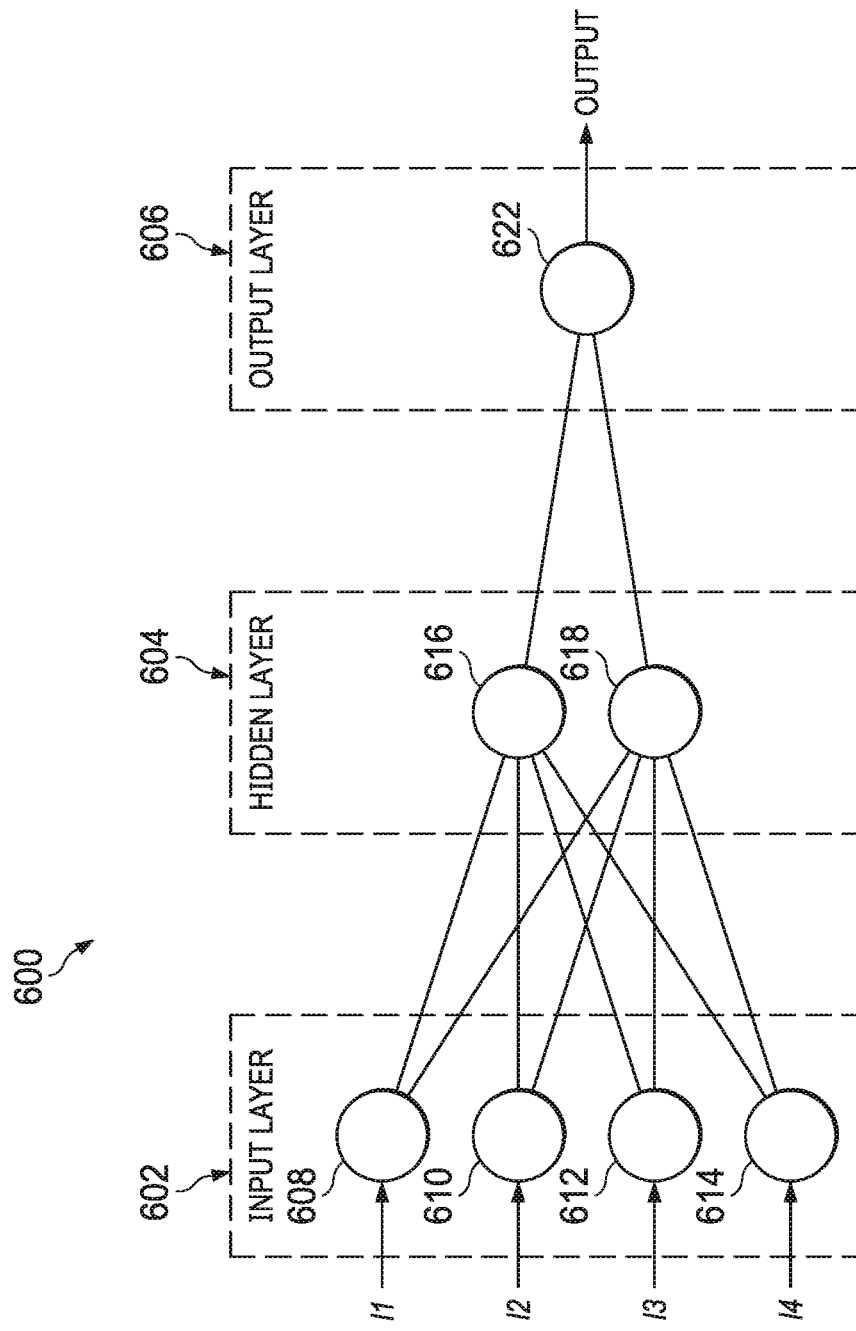
FIG. 6 is a simplified example of an example artificial neural network according to various aspects of the present disclosure.

The machine learning processes discussed above may be implemented using a variety of machine learning techniques. As a non-limiting example, the machine learning may be performed at least in part via an artificial neural network. In that regard, FIG. 6 illustrates an example artificial neural network 600. The artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 may include as many hidden layers as necessary. In this example, the artificial neural network 600 receives a set of input values and produces an output value. Each node in the input layer 602 may correspond to a distinct input value.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning models herein, the output value produced by the artificial neural network 600 may indicate a likelihood of an event (e.g., likelihood of fraud).

The artificial neural network 600 may be trained by using training data. For example, the training data herein may be the features extracted from historical data. By providing training data to the artificial neural network 600, the nodes 616-618 in the hidden layer 604 may be trained (adjusted) such that an optimal output (e.g., the most relevant feature) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
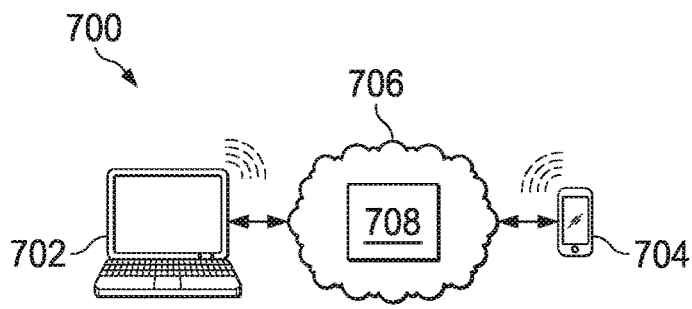
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 (e.g., the user device 110 of FIG. 3) and a computer 702 (e.g., the merchant server 140, the payment provider server 170, or the quantum computer machine learning server 200), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, certain components for performing the quantum computer machine learning processes discussed above may reside on the quantum computer machine learning server 200, while other components for performing the quantum computer machine learning processes discussed above may reside on the payment provider server 170 or on the merchant server 140.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the machine learning process as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Figure 8:
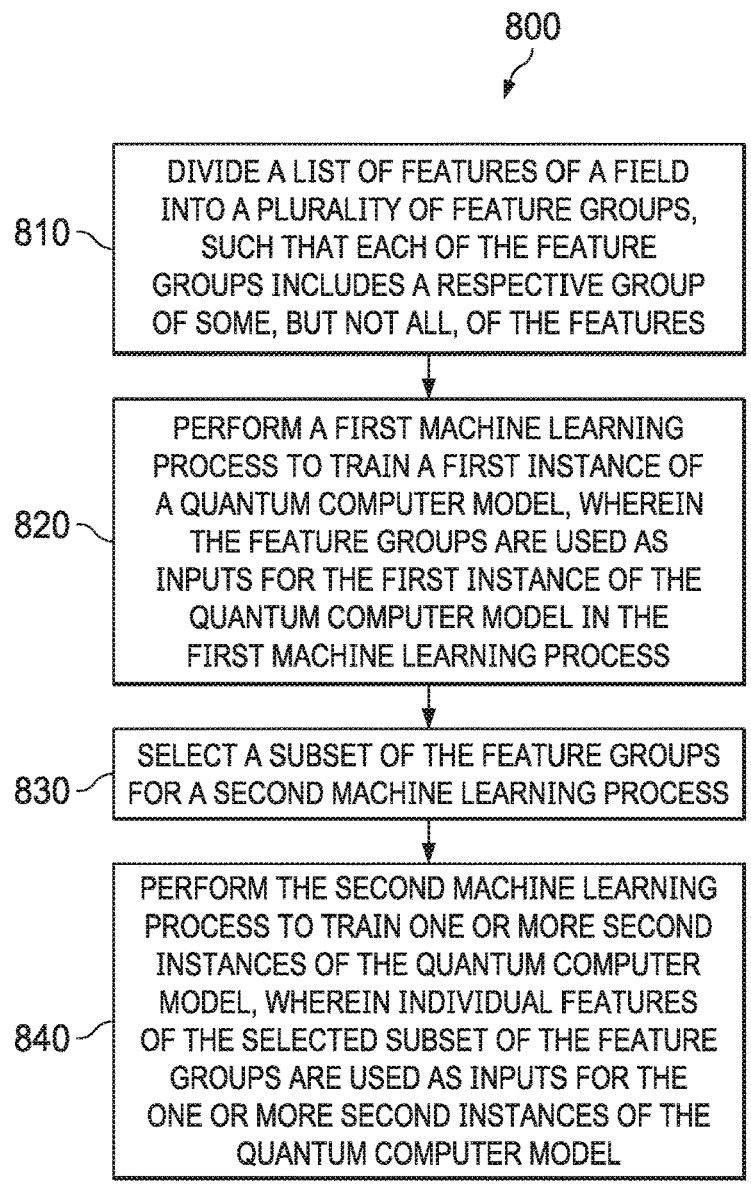
FIG. 8 is a flowchart illustrating a method according to various aspects of the present disclosure.

FIG. 8 is a flowchart illustrating a method 800 for performing quantum computer machine learning processes. The various steps, details of which are discussed here and not repeated below for conciseness, of the method 800 may be performed by one or more electronic processors, for example by the processors of a payment provider. In some embodiments, at least some of the steps of the method 800 may be performed by the quantum computer machine learning server 200 (or by the payment provider server 170) discussed above.

The method 800 includes a step 810 to divide a list of features of a field into a plurality of feature groups, such that each of the feature groups includes a respective group of some, but not all, of the features.

The method 800 includes a step 820 to perform a first machine learning process to train a first instance of a quantum computer model. For example, the first instance of the quantum computer model may include the model 10A of FIGS. 2-3 discussed above. The feature groups are used as inputs for the first instance of the quantum computer model in the first machine learning process.

The method 800 includes a step 830 to select, based on the performing of the first machine learning process, a subset of the feature groups for a second machine learning process. For example, the subset of the feature groups may include the feature groups 60-61 outputted by the model 10A of FIGS. 2-3 discussed above.

The method 800 includes a step 840 to perform the second machine learning process to train one or more second instances of the quantum computer model. For example, the one or more second instances of the quantum computer model may include the model 10B or 10C (or the models 10B and 10C collectively) of FIGS. 2-3 discussed above. Individual features of the selected subset of the feature groups are used as inputs for the one or more second instances of the quantum computer model. For example, the individual features of the feature groups 60-61 may be used as inputs for the models 10B and/or 10C.

In some embodiments, the dividing comprises dividing the list of features based on: a principal component analysis, a random grouping, or a sequential grouping.

In some embodiments, the list of features includes features associated with a plurality of transactions.

In some embodiments, the first machine learning process or the second machine learning process is performed at least in part via a quantum neural network.

In some embodiments, the quantum computer model comprises: a parameterized quantum circuit that includes a layer of trainable single qubit gates followed by fixed two-qubit controlled-not (CNOT) gates, wherein the CNOT gates are configured to entangle qubits of the parameterized quantum circuit; and an optimization circuit coupled to the parameterized quantum circuit, wherein the optimization circuit is configured to train the quantum computer model based on measured outputs of the parameterized quantum circuit.

In some embodiments, the dividing is performed such that a number of the feature groups matches a number of the trainable single qubits of the first instance of the quantum computer model. The performing the first machine learning process comprises feeding each of the feature groups as an input to a respective one of the trainable single qubits of the first instance of the quantum computer model.

In some embodiments, the optimization circuit is further configured to train the quantum computer model at least in part by minimizing a loss function defined as a part of the quantum computer model.

It is understood that additional method steps may be performed before, during, or after the steps 810-840 discussed above. For example, the method 800 may include a step to predict fraud at least in part based on the performing of the second machine learning process. As another example, the method 800 may include a step to select, based on the performing of the second machine learning process, a subset of the features for additional machine learning training while discarding a rest of the features that are unselected. As another example, the method 800 may include a step to generate an updated list of features based on feature groups not selected by the first machine learning process and the subset of the features selected by the second machine learning process. As another example, the method 800 may include a step to iteratively repeat the steps 810-840 until a predefined number of features are selected by the second machine learning process. As another example, the method 800 may include a step to combine the discarded features from the second machine learning process into one or more new feature groups, and a step to perform a third machine learning process to train a third instance of the quantum computer model, wherein feature groups not selected by the first machine learning process and the one or more new feature groups are collectively used as inputs for the third instance of the quantum computer model in the third machine learning process. As another example, the method 800 may include a step to select, based on the performing of the third machine learning process, a further subset of the feature groups for additional machine learning training. As another example, the method 800 may include a step to generate an updated list of features based on the further subset of the feature groups selected by the third machine learning process and the subset of the features selected by the second machine learning process. As another example, the method 800 may include a step to iteratively repeat the steps 810-840 until a predefined number of features are selected by the second machine learning process. For reasons of simplicity, other additional steps are not discussed in detail here.

Based on the above discussions, it can be seen that the present disclosure offers several significant advantages over conventional methods and systems. It is understood, however, that not all advantages are necessarily discussed in detail here, different embodiments may offer different advantages, and that no particular advantage is required for all embodiments. One advantage is improved functionality of a computer. For example, existing quantum computer systems, although powerful, may still be limited in the number of qubits that can be received as the input. This is problematic in a real world machine learning context, where the number of trainable features far exceed the number of qubits of the existing quantum computer system. As such, existing quantum computer systems have not been successfully implemented to perform machine learning processes in real world environments. The present disclosure overcomes this problem via a divide-and-conquer approach, where the large number of trainable features are divided into a list of feature groups, such that the number of the feature groups is less than or equal to the number of input qubits that can be handled by a quantum computer. The feature groups are trained using an instance of a quantum computer machine learning model to identify the optimal feature groups, and the individual features of the identified optimal feature groups are then trained using additional instances of the quantum computer machine learning model to identify the optimal individual features. The unselected feature groups and selected features are then remixed to generate new feature groups, so that the entire process can be iteratively executed any number of times until the best subset of features are obtained. In this manner, the present disclosure effectively enhances the functionality of existing quantum computers by expanding the input capability of the quantum computers. In other words, the present disclosure allows a quantum computer to handle a far greater number of inputs than previously possible.

The inventive ideas of the present disclosure are also integrated into a practical application, for example into the quantum computer machine learning model 10 (or its various instances) discussed above with reference to FIGS. 1-3. Such a practical application can perform an iterative machine learning process using quantum computers, even though the number of trainable features far exceeds the number of input qubits of the quantum computers. The practical application also yields tangible and meaningful results in a real world environment. For example, the practical application may identify which features among thousands or more of features (e.g., IP address, username, transaction amount, geographical location) are the most relevant features in predicting and/or detecting fraud in an electronic transactions context, which can then be used by an entity such as a payment provider to mitigate fraud and improve the electronic security of its payment platform.

The inventive ideas herein are further directed to solving problems that specifically arise in the realm of computer technology, for example, to the limitations of existing quantum computers in performing machine learning processes that require a large number of trainable features. Conventional (e.g., non-quantum-based) computers are not typically constrained by its number of inputs, and thus the problems addressed by the present disclosure do not arise in the context of conventional computers. In addition, when quantum computers are performing processes that only use a small number of trainable features, the problems addressed by the present disclosure also do not arise. As such, it can be seen that the present disclosure is directed to a very unique context to solve a specific problem: how to leverage the computing capabilities of quantum computers to perform a machine learning process even though the number of trainable features of the machine learning process far exceeds the number of input qubits that can be handled by the quantum computers.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: dividing a list of features of a field into a plurality of feature groups, such that each of the feature groups includes a respective group of some, but not all, of the features; performing a first machine learning process to train a first instance of a quantum computer model, wherein the feature groups are used as inputs for the first instance of the quantum computer model in the first machine learning process; based on the performing of the first machine learning process, selecting a subset of the feature groups for a second machine learning process; and performing the second machine learning process to train one or more second instances of the quantum computer model, wherein individual features of the selected subset of the feature groups are used as inputs for the one or more second instances of the quantum computer model.

Another aspect of the present disclosure involves a quantum computer machine learning system. The system includes a first instance of a quantum computer machine learning model that is configured to: receive a plurality of feature groups as inputs, the feature groups each including a different plurality of individual features, respectively; perform a first machine learning process on the plurality of feature groups; and output, based on the first machine learning process, a subset of the feature groups for additional machine learning. The system includes one or more second instances of the quantum computer machine learning model coupled to the first instance of the quantum computer machine learning model. The one or more second instances of the quantum computer machine learning model are each configured to: receive, as inputs, the plurality of individual features of a respective one of the feature groups from the subset of the feature groups outputted by the first instance of the quantum computer machine learning model; perform a second machine learning process on the plurality of individual features; and output, based on the second machine learning process, a subset of the individual features.

Yet another aspect of the present disclosure involves a non-transitory machine-readable medium having stored thereon machine-readable instructions executable to cause a machine to perform operations comprising: dividing a list of features of a field into a plurality of feature groups, such that each of the feature groups includes a different subset of the features; performing a first machine learning process to train a first instance of a quantum computer model, wherein the feature groups are used as inputs for the first instance of the quantum computer model in the first machine learning process; outputting, based on the performing of the first machine learning process, a selected subset of the feature groups for a second machine learning process and a discarded subset of the feature groups; and performing the second machine learning process to train one or more second instances of the quantum computer model, wherein individual features of the selected subset of the feature groups are used as inputs for the one or more second instances of the quantum computer model, and wherein the first instance and the second instance of the quantum computer model are each trained at least in part by minimizing a loss function associated with the quantum computer model.

The foregoing disclosure is not intended to limit the present disclosure to the precise forms or particular fields of use disclosed. As such, it is contemplated that various alternate embodiments and/or modifications to the present disclosure, whether explicitly described or implied here, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   dividing a list of features of a field into a plurality of feature groups, such that each of the plurality of feature groups includes a respective group of some, but not all, of the features;
   performing a first machine learning process to train a first instance of a quantum computer model, the quantum computer model comprising a parameterized quantum circuit that includes a plurality of trainable single qubit gates and a plurality of fixed controlled-not (CNOT) gates, wherein the plurality of feature groups are used as inputs for the first instance of the quantum computer model in the first machine learning process such that a total number of the plurality of trainable single qubit gates of the first instance of the quantum computer model is less than or equal to a total number of the plurality of feature groups, and wherein the first machine learning process is performed at least in part by inputting each feature group of the plurality of feature groups into a respective one of the trainable single qubit gates of the first instance of the quantum computer model, wherein the parameterized quantum circuit further includes a measurement circuit that is configured to measure a result of a training of the trainable single qubit gates at least in part by measuring an electromagnetic frequency;
   based on the performing of the first machine learning process, selecting a subset of the plurality of feature groups for a second machine learning process;
   performing the second machine learning process to train one or more second instances of the quantum computer model, wherein individual features of the selected subset of the plurality of feature groups are used as inputs for the one or more second instances of the quantum computer model;
   based on the performing of the second machine learning process, selecting a subset of the features for additional machine learning training while discarding a rest of the features that are unselected;
   generating an updated list of features based on feature groups of the plurality of feature groups not selected based on performing the first machine learning process and the subset of the features selected based on performing the second machine learning process; and
   iteratively repeating the dividing, the performing the first machine learning process, the selecting the subset of the plurality of feature groups, the performing the second machine learning process, the selecting the subset of the features, and the generating the updated list of features, wherein the iteratively repeating is performed until a predefined number of features are selected based on performing the second machine learning process.

2. The method of claim 1, wherein the dividing comprises dividing the list of features based on: a principal component analysis, a random grouping, or a sequential grouping.

3. The method of claim 1, wherein the list of features includes features associated with a plurality of transactions.

4. The method of claim 1, further comprising: predicting fraud at least in part based on the performing of the second machine learning process.

5. The method of claim 1, wherein the first machine learning process or the second machine learning process is performed at least in part via a quantum neural network.

6. The method of claim 1, wherein the quantum computer model further comprises: an optimization circuit coupled to the parameterized quantum circuit, wherein the optimization circuit is configured to train the quantum computer model based on measured outputs of the parameterized quantum circuit.

7. The method of claim 6, wherein the optimization circuit is further configured to train the quantum computer model at least in part by minimizing a loss function defined as a part of the quantum computer model.

8. The method of claim 1, further comprising:
combining the discarded features from the second machine learning process into one or more new feature groups;
performing a third machine learning process to train a third instance of the quantum computer model, wherein feature groups not selected by the first machine learning process and the one or more new feature groups are collectively used as inputs for the third instance of the quantum computer model in the third machine learning process;
based on the performing of the third machine learning process, selecting a further subset of the plurality of feature groups for additional machine learning training;
generating an updated list of features based on the further subset of the plurality of feature groups selected based on performing the third machine learning process and the subset of the features selected based on performing the second machine learning process; and
iteratively repeating the dividing, the performing the first machine learning process, the selecting the subset of the plurality of feature groups, the performing the second machine learning process, the selecting the subset of the features, the combining, the selecting the further subset of the plurality of feature groups, and the generating the updated list of features, wherein the iteratively repeating is performed until a predefined number of features are selected based on performing the second machine learning process.

9. A machine learning system, comprising: a first instance of a quantum computer machine learning model, wherein the first instance of the quantum computer machine learning model is configured to:
receive a plurality of feature groups as inputs, the plurality of feature groups each including a different plurality of individual features, respectively;
perform a first machine learning process on the plurality of feature groups; and
output, based on the first machine learning process, a subset of the plurality of feature groups for additional machine learning;
one or more second instances of the quantum computer machine learning model coupled to the first instance of the quantum computer machine learning model, wherein the one or more second instances of the quantum computer machine learning model is each configured to:
receive, as inputs, the plurality of individual features of a respective one of the plurality of feature groups from the subset of the plurality of feature groups outputted by the first instance of the quantum computer machine learning model;
perform a second machine learning process on the plurality of individual features; and
output, based on the second machine learning process, a subset of the individual features and a discarded subset of the plurality of feature groups; and
a feature grouping module coupled to inputs of the first instance of the quantum computer machine learning model and coupled to outputs of the one or more second instances of the quantum computer machine learning model, wherein the feature grouping module is configured to:
divide an initial list of features into the plurality of feature groups to be received by the first instance of the quantum computer machine learning model;
receive the discarded subset of the plurality of feature groups as well as the subset of individual features outputted by the one or more second instances of the quantum computer machine learning model;
re-divide the received discarded subset of the plurality of feature groups and the received subset of individual features into an updated list of feature groups; and
output the updated list of feature groups to the inputs of the first instance of the quantum computer machine learning model;
wherein the first instance and the one or more second instances of the quantum computer machine learning model each comprise a parameterized quantum circuit that includes a layer of trainable single qubit gates followed by fixed two-qubit controlled-not (CNOT) gates, wherein the CNOT gates are configured to entangle qubits of the parameterized quantum circuit, and wherein a total number of the trainable single qubit gates is less than or equal to a total number of the plurality of feature groups, wherein the parameterized quantum circuit further includes a measurement circuit that is configured to measure a result of a training of the trainable single qubit gates at least in part by measuring an electromagnetic frequency associated with the qubit gates.

10. The machine learning system of claim 9, wherein the first instance and the one or more second instances of the quantum computer machine learning model each further comprise:
an optimization circuit coupled to the parameterized quantum circuit, wherein the optimization circuit is configured to train the quantum computer machine learning model based on measured outputs of the parameterized quantum circuit.

11. The machine learning system of claim 10, wherein the optimization circuit is configured to train the quantum computer machine learning model at least in part by minimizing a loss function defined as a part of the quantum computer machine learning model.

12. The machine learning system of claim 9, wherein:
the feature grouping module is a first feature grouping module;
the subset of the individual features outputted by the one or more second instances of the quantum computer machine learning model is outputted to the first feature grouping module to be re-divided by the first feature grouping module;

the first instance of the quantum computer machine learning model is further configured to output a discarded subset of the plurality of feature groups;

the one or more second instances of the quantum computer machine learning model are further configured to output discarded individual features; and the machine learning system further comprises:

a second feature grouping module coupled to outputs of the one or more second instances of the quantum computer machine learning model, the second feature grouping module being configured to:

receive the discarded individual features from the outputs of one or more second instances of the quantum computer machine learning model;

divide the received discarded individual features into one or more new feature groups; and output the one or more new feature groups;

a third instance of the quantum computer machine learning model coupled to the outputs of the first instance of the quantum computer machine learning model and coupled to the outputs of the second feature grouping module, wherein the third instance of the quantum computer machine learning model is configured to:

receive, as inputs, the discarded feature groups from the outputs of the first instance of the quantum computer machine learning model, as well as the one or more new feature groups outputted by the second feature grouping module;

perform a third machine learning process on the received discarded feature groups and the one or more new feature groups; and output, based on the third machine learning process and to the first feature grouping module, a further subset of feature groups to be re-divided by the first feature grouping module.

13. A non-transitory machine-readable medium having stored thereon machine-readable instructions executable to cause a machine to perform operations comprising:

dividing a list of features of a field into a plurality of feature groups, such that each of the plurality of feature groups includes a different subset of the features;

performing a first machine learning process to train a first instance of a quantum computer model, the quantum computer model comprising a parameterized quantum circuit that includes a plurality of trainable single qubit gates and a plurality of fixed controlled-not (CNOT) gates, wherein the plurality of feature groups are used as inputs for the first instance of the quantum computer model in the first machine learning process such that a total number of the plurality of trainable single qubit gates of the first instance of the quantum computer model is less than or equal to a total number of the plurality of feature groups, and wherein the first machine learning process is performed at least in part by inputting each feature group of the plurality of feature groups into a respective one of the trainable single qubit gates of the first instance of the quantum computer model, wherein the parameterized quantum circuit further includes a measurement circuit that is configured to measure a result of a training of the trainable single qubit gates at least in part by measuring an electromagnetic frequency associated with the qubit gates;

outputting, based on the performing of the first machine learning process, a selected subset of the plurality of feature groups for a second machine learning process and a discarded subset of the plurality of feature groups;

performing the second machine learning process to train one or more second instances of the quantum computer model, wherein individual features of the selected subset of the plurality of feature groups are used as inputs for the one or more second instances of the quantum computer model, and wherein the first instance and the second instance of the quantum computer model are each trained at least in part by minimizing a loss function associated with the quantum computer model;

outputting, based on the performing of the second machine learning process, a selected subset of the individual features and a discarded subset of the individual features; and based on the selected subset of the individual features and the discarded subset of the plurality of feature groups, iterating the dividing, the performing the first machine learning process, the outputting the selected subset of the plurality of feature groups, the performing the second machine learning process, and the outputting the selected subset of the individual features until a predefined number of features are selected by performing the second machine learning.

14. The non-transitory machine-readable medium of claim 13, wherein the operations further comprise:

performing a third machine learning process to train a third instance of the quantum computer model, wherein the discarded subset of the plurality of feature groups and a new feature group formed by the discarded subset of the individual features are used as inputs for the third instance of the quantum computer model in the third machine learning process; and outputting, based on the performing of the third machine learning process, a further selected subset of the plurality of feature groups, wherein the dividing is performed at least in part based on the further selected subset of the plurality of feature groups.

15. The non-transitory machine-readable medium of claim 13, wherein the dividing comprises dividing the list of features based on: a principal component analysis, a random grouping, or a sequential grouping.

16. The non-transitory machine-readable medium of claim 13, wherein the operations further comprise predicting fraud at least in part based on the performing of the second machine learning process.

* * * * *